United States Patent [19]

Covino-Hrbacek

[11] Patent Number: 5,376,594
[45] Date of Patent: Dec. 27, 1994

[54] LOW TEMPERATURE SYNTHESIS OF YBA2CU3O8-X AND OTHER CRYSTALLINE OXIDES

[75] Inventor: Josephine Covino-Hrbacek, Ridgecrest, Calif.

[73] Assignee: The United States of America as represented by the Secretary of the Navy, Washington, D.C.

[21] Appl. No.: 104,955

[22] Filed: Aug. 2, 1993

[51] Int. Cl.$^5$ ............................................. C04B 35/50
[52] U.S. Cl. ................................ 501/12; 501/152; 501/123; 423/263; 423/593; 505/401; 505/444; 505/441; 505/445
[58] Field of Search ................. 505/1, 734, 735, 738, 505/737, 401, 440, 441, 445; 423/263, 593; 501/152, 123, 12

[56] References Cited

U.S. PATENT DOCUMENTS 4,324,576  4/1982  Matsuyama et al. ................. 501/12
4,588,575  5/1986  David .................................. 423/593
5,135,907  8/1992  Mazdiyas et al. ................... 505/735

Primary Examiner—Mark L. Bell
Assistant Examiner—C. M. Bonner
Attorney, Agent, or Firm—Harvey A. Gilbert; Melvin J. Sliwka; John L. Forrest, Jr.

[57] ABSTRACT

Process for preparing a high temperature superconductor such as yttrium barium copper oxides, by dissolving suitable proportions of hydrolyzable salts, oxides, or organometallic compounds of yttrium, barium and copper in an acid pH-controlled water-containing organic solvent such as methanol, and subjecting the resulting solution to ultrasonic energy or to an oxidation-reduction reaction, preferably while passing oxygen under a positive pressure through the solution, and precipitating a hydrolyzed precursor material. Such precursor material is then heated or annealed at temperatures between about 300° C. and about 600° C., also preferably in the presence of flowing oxygen, to produce the desired high temperature superconductor material.

17 Claims, No Drawings

LOW TEMPERATURE SYNTHESIS OF YBA2CU3O8-X AND OTHER CRYSTALLINE OXIDES

BACKGROUND OF THE INVENTION

This invention relates to the preparation of high temperature superconductors, and is particularly directed to a low temperature process for the preparation of high temperature superconductors such as yttrium barium copper oxide.

High temperature superconducting materials are generally those materials having superconductivity at temperatures higher than 30° K., usually in the $T_c$ range of 95°–130° K.

Recently the high temperature synthesis of yttrium barium copper oxide, $YBa_2Cu_3O_{8-x}$, a high temperature superconductor material, has been prepared by the high-temperature solid-state reactions of $Y_2O_3$, $BaCO_3$ and $CuO$ in stoichiometric quantities corresponding to the desired metal mode ratio of 1:2:3 respectively. The reactants are ground together using an agate mortar and pestle and heated at 950° C. for 12 hours in air. This method requires pure starting materials and high temperatures, and the very crystalline highly sintered product cannot be readily made into useful devices. Additionally, scale-up of the reaction presents difficulties.

It is one object of the invention to prepare high temperature superconductors such as yttrium barium copper oxide by an improved procedure.

Another object is to provide a procedure for preparing high temperature superconductors using substantially lower temperatures than heretofore employed.

Still another object is the provision of a relatively simple procedure for producing high temperature superconductors employing commercially available starting materials and which can be incorporated into useful devices.

These and many other objects, advantages, and features are described in the drawings and detailed description that follows.

SUMMARY OF THE INVENTION

It has been found that by dissolving suitable proportions of hydrolyzable salts, oxides, or organometallic compounds of, for example, yttrium, barium and copper in an acid pH-controlled water-containing organic solvent, and subjecting the resulting solution either (1) to ultrasonic energy or (2) to an electrochemical or oxidation-reduction reaction, preferably under a positive pressure of oxygen in both procedures, a hydrolyzed precursor is precipitated which upon heating at substantially lower temperatures than heretofore employed, e.g. 300° to 600° C., results in the production of a high temperature superconductor material of metal oxides, such as yttrium barium copper oxide, $YBa_2Cu_3O_{8-x}$.

DETAILED DESCRIPTION OF THE INVENTION AND PREFERRED EMBODIMENTS

High temperature superconducting materials produced by the invention process have the general formula, $$RM_2Cu_3O_{8-x}, \tag{1}$$

where R is one of the rare earth metals Y, Pr, Dy, La, Eu, Ho, Nd, Sm or Gd.

where M is an alkaline earth metal, particularly Ba, Ca or Sr, and where x ranges from 1 to 2.

A particularly preferred material of this type is where R is yttrium and M is barium, as exemplified by the preferred high temperature superconducting material of the formula, $$YBa_2Cu_3O_{8-x}. \tag{2}$$

In carrying out the invention process, stoichiometric amounts of hydrolyzable salts, oxides, or organometallic compounds of R, M and Cu are dissolved in an acid pH-controlled water-containing organic solvent. It may be desirable to form several separate solutions which are later combined into a single solution. Since the preferred material produced according to the invention is yttrium barium copper oxide, $YBa_2Cu_3O_{8-x}$, the procedure described hereafter will be essentially in terms of producing such material, although it is to be recognized that the same procedure can be applied for producing any of the superconducting materials within the above general formula (1).

Thus, for producing $YBa_2Cu_3O_{8-x}$, according to the invention, the yttrium source can be, for example, yttrium nitrate, yttrium oxide, yttrium oxalate or yttrium-2, 4-pentanedionate. The barium source can be, for example, barium carbonate or barium acetate. Copper acetate, copper ethoxide, copper carbonate or copper nitrate are exemplary of the copper source. The three source compounds for Y, Ba and Cu are employed in molecular proportions of 1, 2 and 3, respectively; thus, 2 moles of the Ba hydrolyzable salt or source compound and 3 moles of the Cu hydrolyzable salt or source compound, per mole of the Y hydrolyzable salt or source compound.

A mixture of water and suitable organic solvent, e.g. a low molecular weight alcohol, preferably an alcohol of 1 to 4 carbon atoms, e.g. methyl, ethyl, propyl, isopropyl, isobutyl or tertiary butyl alcohol is used as the solvent. The mixed solvent preferably has a boiling point not in excess of 100° C. The alcohol is added to the mixture to achieve the proper consistency, employing about 0.9 to about 1.0 volumes of alcohol per unit volume of water, preferably about equal volumetric proportions of water and alcohol. The total solids content of the water-alcohol solution containing the three source compounds of Y, Ba and Cu can range from about 0 grams per 100 ml of solvent to the solubility limit of the solids in the stoichiometric amounts, preferably about 1 to 5 grams of solid per 100 ml of solvent. The pH of the solution is adjusted to a range from about 0 to about 6, usually about 1 to about 6, by addition of a suitable acid such as hydrochloric acid or nitric acid.

The resulting solution is then subjected to ultrasonic energy or to an oxidation-reduction reaction for depositing energy into the system and precipitating a hydrolyzed precursor oxide mixture, which is then subjected to heat treatment according to the invention, to produce the $RM_2Cu_3O_{8-x}$ product, and for example the yttrium barium copper oxide, $YBa_2Cu_3O_{8-x}$ of the invention. Use of the ultrasonic energy procedure is preferred.

In the ultrasonic method, ultrasonic energy is applied to the solution at controlled frequencies and voltages. Thus, a Bramson Instruments ultrasonic generator operating at current ranges of 4 to 8 amps D.C. for about 20 to about 50 minutes can be used to precipitate out the desired hydrolyzed precursor in the form of the desired stoichiometric oxides, although the actual composition of such hydrolyzed precursor has not been established. Precipitation of such hydrolyzed precursor is facilitated by raising the temperature of the solution, e.g. to between about 40° C. and about 100° C. (i.e., just below the boiling point of the solvent), and by operating under a positive pressure of oxygen. Thus, oxygen at a slight positive pressure, e.g. 1 psi, up to as high as 400 psi, e.g. 2 atmospheres, can be passed through the solution undergoing ultrasonic energy treatment. The solvent is then removed by suitable means such as decantation and the resulting hydrolyzed precursor is recovered.

The desired hydrolyzed precursor oxide mixture can alternatively be achieved by a modification employing an oxidation-reduction or electrochemical reaction. This is achieved by placing positive and negative electrodes into the solution of stoichiometric amounts of hydrolyzable salts, oxides, or organometallic compounds of the corresponding desired oxides as noted above, and then adjusting the current, voltage, temperature and oxygen pressure to facilitate precipitation of the mixed oxides precursor. For this purpose, for example, platinum electrodes, or a graphite anode and nichrome cathode can be employed as electrodes. A cathode current density ranging from about 1 to about 200 mA/cm$^2$ (at voltages from about 5 to 10 volts), for a time ranging from 10 hours up to more than 1 week can be employed, while flowing oxygen through the solution at a slight positive pressure, e.g. 1 psi, up to as high as 400 psi, e.g. 2 atmospheres, and at solution temperatures between about 40° C. and about 100° C., e.g. just below the boiling point of the mixed solvent, preferably about 60° to 70° C.

The electrochemical procedure results in precipitation of a hydrolyzed precursor of mixed oxides in the form of a fine powder, which can be recovered by removal of solvent, e.g., by drying overnight. Where platinum electrodes are used, one can introduce a seed crystal of the desired compound, e.g. the YBa$_2$Cu$_3$O$_{8-x}$ previously produced, to enhance the precipitation of the hydrolyzed precursor solids.

The hydrolyzed precursor in the form of a powder recovered from either the ultrasonic or oxidation-reduction procedure described above, can be further ground, placed in a crucible and heat treated therein at temperature ranging from about 300° to 600° C., for at least 1 up to about 24 hours, and preferably in the presence of flowing oxygen, to recover the desired high temperature superconductor material of formula (1) above, particularly yttrium barium copper oxide. The preferred YBa$_2$Cu$_3$O$_{8-x}$ produced by the invention process has a $T_c$ as high as 140°-150° C.

The following are examples of practice of the invention:

EXAMPLE 1

0.226 grams of Yttrium oxide, Y$_2$O$_3$(0.002 mole), 1.09 grams of barium acetate, Ba(C$_2$H$_3$O$_2$)$_2$.H$_2$O, (0.004 mole) and 1.449 grams of copper nitrate, CU(NO$_3$)$_2$.3H$_2$O (0.006 mole), in a molar ratio of 1:2:3, respectively, were mixed and added to 40 ml of distilled water and 40 ml of methanol. The Y$_2$O$_3$ did not dissolve.

The resulting solution was heated to about 64° C. and the pH of the solution was adjusted to about 1 by the addition of about 5 drops of nitric acid. With an oxygen flow of about 2 atmospheres of pressure through the solution, the solution was subjected to sonication by means of a Bramson Instruments ultrasonic generator at a current of about 4–8 A D.C. for about 20 minutes. The pH of the solution at the end of sonication was close to 0 and the temperature of the solution was about 49° C. A precipitate deposited in the solution during sonication.

The water and methanol solution was removed by evaporation and the solid residue was dried by standing in a hood overnight. The dried hydrolyzed precursor solids were ground with an agate mortar pestle, placed in a ceramic crucible and heat treated at 600° C. for about 16 hours in flowing oxygen at about 2 atmospheres pressure, to produce the YBa$_2$Cu$_3$O$_{8-x}$ material, where x is about 1.5. The material was determined by evidence of the x-ray powder pattern.

EXAMPLE 2

0.38 grams yttrium nitrate, 0.547 grams of Ba(C$_2$H$_3$O$_2$)$_2$.H$_2$O and 1.108 grams Cu(NO$_3$)$_2$.3H$_2$O, in a molar ration of 1:2:3 respectively, were each dissolved in separate solution of 10 ml distilled water and 10 ml of propanol. Five drops of concentrated HNO$_3$ were added to each solution. All three solutions were then combined. To this combined solution was added 25 ml of water and 10 drops of concentrated HNO$_3$. The pH of the final solution was 1.78.

The solution was heated to about 50° C. While an oxygen flow at about 2 atmospheres pressure bubbled through the solution, the solution was subjected to sonication by means of a Bramson Instruments ultrasonic generator at a current of about 4–8 A D.C. for about 20 minutes. The pH of the solution at the end of sonication was between 1 and 2, and the temperature of the solution was about 49° C. A precipitate deposited in the solution during sonication.

The water and propanol solution was removed by evaporation and the solid residue was dried by standing in a hood overnight. The dried hydrolyzed precursor solids were ground with an agate mortar pestle, placed in a ceramic crucible, and heat treated at 500° C. for about 16 hours in flowing oxygen at about 2 atmospheres pressure, to produce the YBa$_2$Cu$_3$O$_{8-x}$ material, where x is about 1.5.

EXAMPLE 3

The same pH adjusted water-methanol solution of barium acetate, copper nitrate and yttrium oxide is prepared as in Example 1.

The solution is placed in an Al$_2$O$_3$ crucible and two platinum electrodes are placed in the solution. A cathode current density of about 150 to about 200 mA at a voltage of about 5 volts is applied for about 10–20 hours, while flowing oxygen at a pressure of about 2 atmospheres through the solution, at a temperature of about 100° to about 200° C. A precursor precipitate is deposited in the solution.

EXAMPLE 4

The same pH adjusted water-propanol solution of barium acetate, copper nitrate and yttrium nitrate is prepared as in Example 2.

Into this solution is introduced a graphite anode and a nichrome cathode. A cathode current density of about 1 to 20 mA per cm$^2$ at a voltage of about 10 volts is applied for about 10–20 hours, while flowing oxygen at about 2 atmospheres pressure through the solution, at a temperature of about 50° to about 80° C., and forming a precipitate in the solution.

EXAMPLE 5

The same pH adjusted water-methanol solution of barium acetate, copper nitrate and yttrium oxide is prepared as in Example 1 or the same pH adjusted water-propanol solution of barium acetate, copper nitrate and yttrium nitrate is prepared as in Example 2.

Into this solution is introduced 2 platinum electrodes. One electrode has a YBa$_2$Cu$_3$O$_{8-x}$ seed crystal attached. A cathode current density of about 1 to 20 mA per cm$^2$ at a voltage of about 10 volts is applied for about 10 hours to about 1 week, while flowing oxygen at about 2 atmospheres pressure through the solution, at a temperature of about 60° to about 70° C., and forming a precipitate in the solution.

EXAMPLE 6

After removing the precipitate from the solution of Examples 3, 4, or 5 and drying it, the resulting fine powder is ground and annealed at a temperature of about 500° to about 600° C. for a time period of about 16 hours in the presence of flowing oxygen at about 2 atmospheres pressure. The desired YBa$_2$Cu$_3$O$_{8-x}$ product is obtained.

From the foregoing it is seen that the invention provides novel procedure for producing a high temperature superconductor such as yttrium barium copper oxides using relatively low temperatures for reacting precursor oxides of the respective metals obtained by initially reacting hydrolyzable salts, oxides, or organometallic compounds of the respective metals by either an ultrasonic treatment or an electrochemical treatment of a pH adjusted water-alcohol solution of such hydrolyzable salts, to produce such precursor oxides. The process utilized low cost starting materials which can be obtained in relatively pure form or are easily purified. The process is generally more rapid than conventional processes and is readily scaled up. The invention process produces the described metal oxides useful for a variety applications such as coatings or for making machinable castings.

Since various changes and modifications can be made in the invention without departing from the spirit of the invention, the invention is not to be taken as limited except by the scope of the appended claims.

What is claimed is:

1. A method for preparation of compounds having the formula:

RM$_2$Cu$_3$O$_{8-x}$ where R is selected from the group consisting of Y, Pr, Dy, La, Eu, Ho, Nd, Sm and Gd; M is selected from the group consisting of Ba, Ca and Sr; and x ranges from about 1 to about 2, which comprises:
   (A) placing hydrolyzable salts, oxides, or organometallic compounds of R, M and Cu in stoichiometric proportions of about 1, 2 and 3, respectively, in a solution of mixed water/organic solvent at an acidic pH, and at a temperature range from about 40° C. to about 100° C.;
   (B) subjecting the solution under a positive pressure of oxygen to a means for precipitating a precursor;
   (C) removing the solvent to produce a residual precipitated precursor; and,
   (D) subjecting the residual precipitated precursor to heating at a temperature ranging from about 300° C. to about 600° C.

2. The process of claim 1, where R is Y and M is Ba.

3. The process of claim 2, where the yttrium compound is selected from the group consisting of yttrium nitrate, yttrium oxide and yttrium-2, 4-pentanedionate, the barium compound is selected from the group consisting of barium carbonate and barium acetate, and the copper compound is selected from the group consisting of copper acetate, copper ethoxide, copper carbonate and copper nitrate.

4. The process of claim 1, where said solution is a mixture of water and an alcohol of 1 to 4 carbon atoms.

5. The process of claim 4, wherein said alcohol is methanol or propanol.

6. The process of claim 4, wherein said alcohol is 0.9 to 1.0 units of volume per 1.0 unit of volume of water.

7. The process of claim 1, wherein the pH range is about 0 to about 6.

8. The process of claim 7 wherein the pH is adjusted using hydrochloric acid or nitric acid.

9. The process of claim 7, wherein the positive pressure of oxygen of step (B) ranges from about 1 p.s.i. to about 400 p.s.i.

10. The process of claim 1, wherein the positive pressure of oxygen of step (B) is about 2 atmospheres.

11. The method of claim 1, wherein the precipitating means of step (B) is ultrasonic energy or an oxidation-reduction reaction.

12. The process of claim 11, wherein said precipitating means of step (B) is ultrasonic energy at a current ranging from about 4 to 8 amps D.C., for a period sufficient to precipitate said hydrolyzed precursor.

13. The process of claim 11, wherein said precipitating means of step (B) is an oxidation-reduction reaction produced by inserting positive and negative electrodes in said solution under suitable conditions of current and voltage, for a period sufficient to precipitate said hydrolyzed precursor.

14. The process of claim 13, wherein said current is about 1 to 20 mA and said voltage is about 5 to 10 volts.

15. The process of claim 11, wherein said heating said precipitated precursor of step (D) is carried out in the presence of flowing oxygen.

16. The process of claim 3, where said solution is a mixture of water and an alcohol of 1 to 4 carbon atoms, where the pH adjusted using hydrochloric acid or nitric acid, and wherein said resulting solution is subjected to ultrasonic energy at a current ranging from about 4 to about 8 amps D.C., for a period sufficient to precipitate said hydrolyzed precursor.

17. The process of claim 3, where said solution is a mixture of water and alcohol of 1 to 4 carbon atoms, where the pH is adjusted using hydrochloric acid or nitric acid, and wherein said solution is subjected to an oxidation-reduction reaction produced by inserting positive and negative electrons in said solution under suitable conditions of current and voltage, for a period sufficient to precipitate said hydrolyzed precursor.

* * * * *